United States Patent
Okamoto et al.

(10) Patent No.: US 9,269,494 B2
(45) Date of Patent: Feb. 23, 2016

(54) MONOLITHIC CERAMIC ELECTRONIC COMPONENT

(71) Applicant: Murata Manufacturing Co., Ltd., Nagaokakyo-shi, Kyoto-fu (JP)

(72) Inventors: Yoshiji Okamoto, Nagaokakyo (JP); Toshihiro Nakai, Nagaokakyo (JP); Shingo Okuyama, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 412 days.

(21) Appl. No.: 13/865,231

(22) Filed: Apr. 18, 2013

(65) Prior Publication Data

US 2013/0279071 A1  Oct. 24, 2013

(30) Foreign Application Priority Data

Apr. 19, 2012  (JP) .................................. 2012-095268

(51) Int. Cl.
*H01G 4/228* (2006.01)
*H01G 4/30* (2006.01)
*H01G 4/232* (2006.01)
*H01G 2/06* (2006.01)

(52) U.S. Cl.
CPC ................. *H01G 4/30* (2013.01); *H01G 4/232* (2013.01); *H01G 4/2325* (2013.01); *H01G 2/065* (2013.01)

(58) Field of Classification Search
USPC .......................................... 361/306.3, 301.4
See application file for complete search history.

(56) References Cited

U.S. PATENT DOCUMENTS

| | | | |
|---|---|---|---|
| 6,058,005 A * | 5/2000 | Matoba et al. | 361/321.4 |
| 6,331,929 B1 * | 12/2001 | Masuda | 361/303 |
| 2008/0180877 A1 | 7/2008 | Togashi et al. | |
| 2010/0123995 A1 | 5/2010 | Otsuka et al. | |
| 2013/0279071 A1 | 10/2013 | Okamoto et al. | |

FOREIGN PATENT DOCUMENTS

| | | |
|---|---|---|
| CN | 203150392 U | 8/2013 |
| JP | 63-312693 A | 12/1988 |
| JP | 02155209 A * | 6/1990 |
| JP | 02-137023 U | 11/1990 |
| JP | 05-166663 A | 7/1993 |

(Continued)

OTHER PUBLICATIONS

Official Communication issued in corresponding Japanese Patent Application No. 2012-095268, mailed on Sep. 24, 2014.

(Continued)

*Primary Examiner* — Eric Thomas
(74) *Attorney, Agent, or Firm* — Keating & Bennett, LLP

(57) ABSTRACT

Solder-repellent portions are each arranged so as to extend over all or substantially all of a portion of a corresponding one of outer electrodes provided on a corresponding one of end surfaces of a monolithic ceramic electronic component and partially on portions of the outer electrode provided over two side surfaces of the monolithic ceramic electronic component. When the monolithic ceramic electronic component is mounted on the circuit board, solder does not adhere to the end surfaces and portions of the outer electrode provided on portions of the two side surfaces. Thus, expansion and contraction that occur as a result of application of an AC voltage is not transmitted or is not significantly transmitted to the circuit board. Consequently, vibrations of the circuit board are significantly reduced or prevented.

20 Claims, 6 Drawing Sheets

(56) References Cited

FOREIGN PATENT DOCUMENTS

| | | |
|---|---|---|
| JP | 05-062003 U | 8/1993 |
| JP | 05-243074 A | 9/1993 |
| JP | 08-330174 A | 12/1996 |
| JP | 10-270288 A | 10/1998 |
| JP | 2000-150292 A | 5/2000 |
| JP | 2004-186502 A | 7/2004 |
| JP | 2008-187036 A | 8/2008 |
| JP | 2010-123614 A | 6/2010 |
| JP | 2010-186884 A | 8/2010 |
| JP | 2012-054411 A | 3/2012 |

OTHER PUBLICATIONS

URL:http://www.murata.co.jp/products/capacitor/solution/naki.html, 5 pages.

Okamoto et al.; "Monolithic Ceramic Electronic Component"; U.S. Appl. No. 13/865,235, filed Apr. 18, 2013.

Official Communication issued in corresponding Japanese Patent Application No. 2012-095268, mailed on Feb. 18, 2014.

* cited by examiner

MONOLITHIC CERAMIC ELECTRONIC COMPONENT

BACKGROUND OF THE INVENTION

1. Field of the Invention

The present invention relates to monolithic ceramic electronic components, and particularly to a monolithic ceramic capacitor manufactured by a method of reducing acoustic noise generated when an electric field is applied to the monolithic ceramic capacitor mounted on a circuit board.

2. Description of the Related Art

As electronic devices produce increasingly less noise, acoustic noise has become more noticeable, caused by vibrations of monolithic ceramic capacitors (referred to as "monolithic capacitors", below) in power circuits or other components of various apparatuses, such as laptop computers, mobile phones, or digital cameras.

Japanese Unexamined Patent Application Publication No. 2010-186884 describes that acoustic noise occurs when an AC voltage is applied to a monolithic capacitor mounted on a circuit board due to electrostrictive vibrations of the monolithic capacitor propagating through the circuit board.

FIG. 5 and FIG. 6 are drawings illustrated on an online web page "Examples of Noise Countermeasures" of Murata Manufacturing Co., Ltd., searched on Mar. 1, 2012, through Internet URL "http://www.murata.co.jp/products/capacitor/solution/naki.html". When an AC voltage is applied to a monolithic capacitor 110, the monolithic capacitor 110 expands and contracts in directions indicated by the bold arrows, as illustrated in FIG. 5, due to the electrostrictive effect of the ferroelectric ceramic of the monolithic capacitor 110. In FIG. 5, the WT cross section denotes a cross section defined by the width and the thickness of the monolithic capacitor 110. The LT cross section denotes a cross section defined by the length and the thickness of the monolithic capacitor 110. The LW cross section denotes a cross section defined by the length and the width of the monolithic capacitor 110. The broken lines indicate the extent to which the monolithic capacitor 110 expands and contracts when viewed in these cross sections.

As illustrated in FIG. 6, when an AC voltage is applied to the monolithic capacitor 110 that is mounted on the circuit board 101 via a solder 102, the monolithic capacitor 110 expands and contracts and this expansion and contraction of the monolithic capacitor 110 leads to deformation of the circuit board 101 via the solder 102. Thus, the circuit board 101 vibrates in such directions that the surface of the circuit board 101 rises and falls. When the cycle of vibrations of the circuit board 101 falls within a frequency range (20 Hz to 20 kHz) that is audible to human beings, human ears perceive the vibrations as acoustic noise.

These are problems not only for the monolithic capacitor 110 having two outer electrodes 114 but also for a three-terminal monolithic capacitor having three outer electrodes 114. Further, these problems can occur not only in the monolithic capacitor 110, but also in any monolithic ceramic electronic component including a monolithic LC filter.

SUMMARY OF THE INVENTION

Accordingly, preferred embodiments of the present invention provide a monolithic ceramic electronic component that overcomes the problems described above.

A monolithic ceramic electronic component according to a preferred embodiment of the present invention includes a ceramic laminate body having a cuboid or substantially cuboid shape and including dielectric ceramic layers and internal electrodes that are alternately stacked on top of one another, the ceramic laminate body including an outer periphery defined by an upper surface, a lower surface, two side surfaces, and two end surfaces that are perpendicular or substantially perpendicular to the upper surface, the lower surface, and the two side surfaces; and an outer electrode that is disposed on one of the end surfaces and portions of the upper and lower surfaces and portions of the two side surfaces that are continuous with the end surface so as to be electrically connected to the internal electrodes. The outer electrode includes a solder-repellent portion that does not allow molten solder to adhere thereto and a solder-receivable portion that allows the molten solder to adhere thereto. The solder-repellent portion is arranged so as to extend over all or substantially all of a portion of the outer electrode provided on the end surface and so as to extend partially over portions of the outer electrode provided on the two side surfaces. The solder-receivable portion is provided in a portion of the outer electrode excluding the solder-repellent portion.

When a direction in which the dielectric ceramic layers are stacked is a vertical direction of the monolithic ceramic electronic component, the solder-receivable portion may preferably have a shape such that upper and lower portions of the solder-receivable portion in the vertical direction are symmetrical or substantially symmetrical with each other.

The solder-repellent portion may preferably be defined by a solder-resistant film attached to the outer electrode.

The solder-resistant film may preferably be made of a heat-resistant resin that is not deformed at a soldering temperature.

The solder-repellent portion may preferably be provided by oxidizing the outer electrode.

The solder-receivable portion may preferably be provided in a portion of the outer electrode that is exposed to the outside.

In the monolithic ceramic electronic component according to various preferred embodiments of the present invention, each solder-repellent portion is positioned so as to cover all or substantially all of the corresponding end surface of the ceramic laminate body and portions of the upper, lower, and side surfaces of the ceramic laminate body. Thus, molten solder is prevented from adhering to the end surface and the portions of the side surfaces. Consequently, acoustic noise generated when an AC voltage is applied to the monolithic ceramic electronic component mounted on the circuit board is reduced. Further, since each solder-receivable portion is provided in a portion of the corresponding outer electrode other than the solder-repellent portion, the monolithic ceramic electronic component can be firmly connected to the circuit board after being mounted on the circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
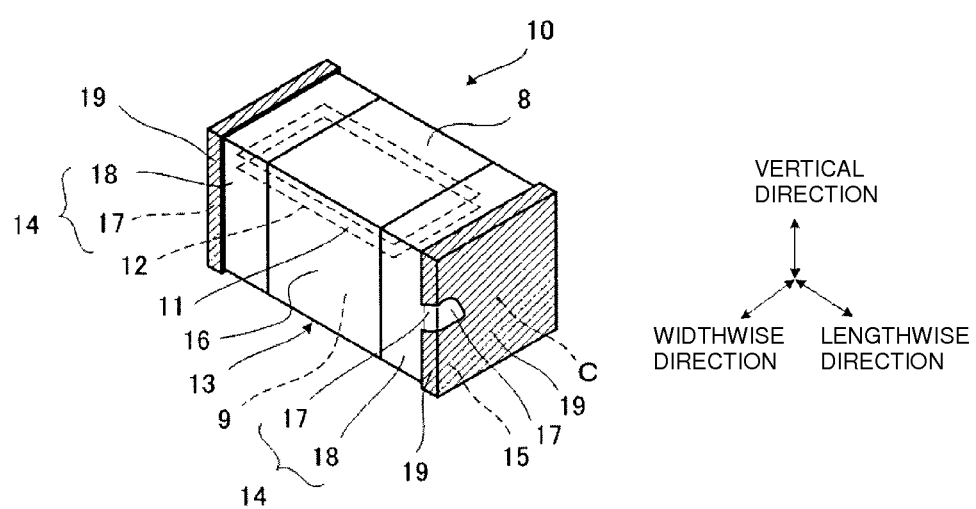
FIG. 1 illustrates a monolithic ceramic capacitor according to a first preferred embodiment of the present invention.

As illustrated in FIG. 1, a monolithic ceramic capacitor 10 includes a ceramic laminate body 13, including a plurality of alternating layers of dielectric ceramic layers 11 and internal electrodes 12, and a pair of outer electrodes 14 provided on both end portions of the ceramic laminate body 13. The outer periphery of the ceramic laminate body 13 is defined by an upper surface 8, a lower surface 9, two side surfaces 16, and two end surfaces 15 extending perpendicular or substantially perpendicular to the upper surface 8, the lower surface 9, and the two side surfaces 16. The internal electrodes 12 are arranged such that each of two adjacent electrodes 12 faces each other with one dielectric ceramic layer 11 interposed therebetween. One of the opposing internal electrodes 12 is connected to a corresponding one of the outer electrodes 14, and the other one of the opposing internal electrodes 12 is connected to the other of the opposing outer electrodes 14. The outer electrode 14 is primarily arranged so as to cover a corresponding one of the end surfaces 15 of the ceramic laminate body 13, but also covers portions of the upper surface 8, the lower surface 9, and the two side surfaces 16 that are continuous with the end surface 15. Another outer electrode 14 is similarly arranged over the other end surface 15.

Herein, for convenience purposes, the monolithic ceramic capacitor 10 is referred to as a monolithic capacitor 10, the dielectric ceramic layer 11 is referred to as a dielectric layer 11, and the ceramic laminate body 13 is referred to as a laminate body 13. In a description of the orientation of the monolithic capacitor 10, the direction in which the dielectric layers 11 are stacked is referred to as a vertical direction, the direction in which the pair of outer electrodes 14 are arranged is referred to as a lengthwise direction, and the direction perpendicular or substantially perpendicular to the vertical direction and the lengthwise direction is referred to as a widthwise direction.

The laminate body 13 preferably has a cuboid or substantially cuboid shape with the corners thereof rounded off, for example. The outer electrodes 14 provided on both end surfaces 15 of the laminate body 13 also have rounded portions so as to correspond to the shape of the corners of the laminate body 13. However, in the first preferred embodiment of the present invention, each end surface 15 of the laminate body 13 may include the above-described rounded portions in addition to a flat portion. Thus, the end surfaces 15 are illustrated as being flat in FIG. 1 and the rounded portions are not illustrated.

In the first preferred embodiment, as illustrated in FIG. 1, the outer electrodes 14 of the monolithic capacitor 10 each preferably include a solder-repellent portion 17 and a solder-receivable portion 18. The solder-repellent portion 17 is a portion that does not allow molten solder to adhere thereto when the molten solder is brought into contact with the solder-repellent portion 17 from the outside of the monolithic capacitor 10. The solder-receivable portion 18 is a portion that allows the molten solder to adhere thereto. The solder-repellent portion 17 is preferably arranged so as to extend over all or substantially all of a portion of the corresponding outer electrode 14 provided on the end surface (this portion will also be referred to as an end surface portion of the outer electrode 14) and so as to extend partially over portions of the outer electrode 14 provided on the upper surface 8, the lower surface 9, and the side surfaces 16 (these portions will be respectively referred to as an upper surface portion, a lower surface portion, and side surface portions, below). The solder-receivable portion 18 is defined as a portion of the outer electrode 14 excluding the solder-repellent portion 17.

Specifically, each solder-repellent portion 17 is preferably defined by a solder-resistant film 19 that is attached to the outer electrode 14. The solder-resistant film 19 is attached to all or substantially all of a portion of the outer electrode 14 that continuously extends from the end surface portion to a portion of the side surface portion, the upper surface portion, and the lower surface portion. For easy understanding, the solder-resistant film 19 is illustrated as being partially removed in FIG. 1 to show the solder-repellent portion 17 underneath. The solder-receivable portion 18 is defined as a portion of the outer electrode 14 not covered by the solder-resistant film 19. The solder-repellent portion 17 is preferably configured such that upper and lower portions of the solder-repellent portion 17 are symmetrical with each other and the solder-receivable portion 18 also preferably has a shape such that upper and lower portions of the solder-receivable portion 18 are symmetrical with each other.

Preferably, the solder-resistant film 19 is made of a material that is not deformed at the soldering temperature (for example, approximately 139° C. or higher), such as a heat-resistant resin, for example. Each outer electrode 14 preferably includes, for example, three layers of copper (Cu), nickel (Ni), and tin (Sn) or copper (Cu), nickel (Ni), and gold (Au). The materials of the outer electrodes 14 allow the molten solder to adhere thereto when the molten solder is brought into contact therewith. Examples of the material of the molten solder include a tin-silver-copper (Sn—Ag—Cu) alloy.

The dielectric layers 11 are preferably made of a ferroelectric material, such as barium titanate, for example. Therefore, when an AC voltage is applied to the pair of outer electrodes 14 of the monolithic capacitor 10, the polarities of the dielectric layers 11 are reversed and thus the electrostrictive phenomenon occurs.

Figure 2:
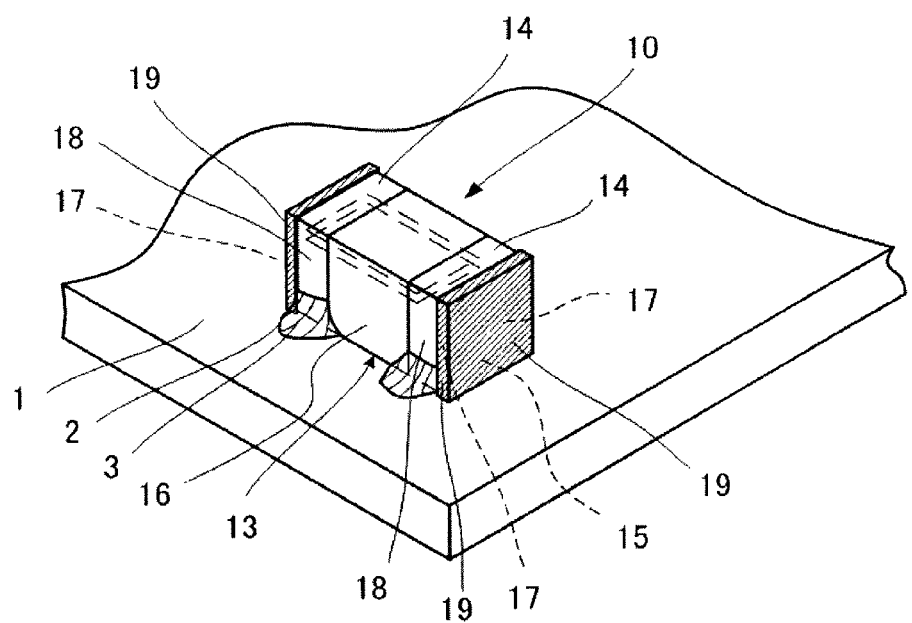
FIG. 2 illustrates a state in which the monolithic ceramic capacitor illustrated in FIG. 1 is mounted on a circuit board.

FIG. 2 illustrates a state where the monolithic capacitor 10 according to the first preferred embodiment is mounted on a circuit board 1 via a solder 2. As illustrated in FIG. 2, molten solder adheres to the solder-receivable portions 18 of the monolithic capacitor 10 and fillets 3 are provided so as to connect the solder-receivable portions 18 to the circuit board 1. However, the molten solder does not adhere to the solder-repellent portions 17, that is, the all or substantially all of the end surfaces 15 and a portion of the side surfaces 16 and, thus, the fillets 3 are not provided over these portions.

Figure 5:
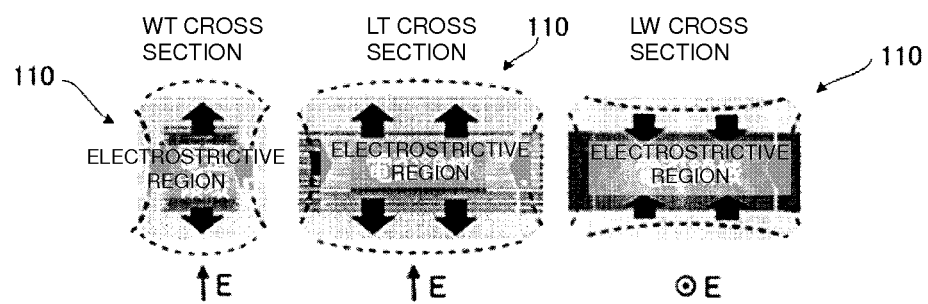
FIG. 5 illustrates a state in which an AC voltage is applied to a known monolithic ceramic capacitor.
Figure 6:
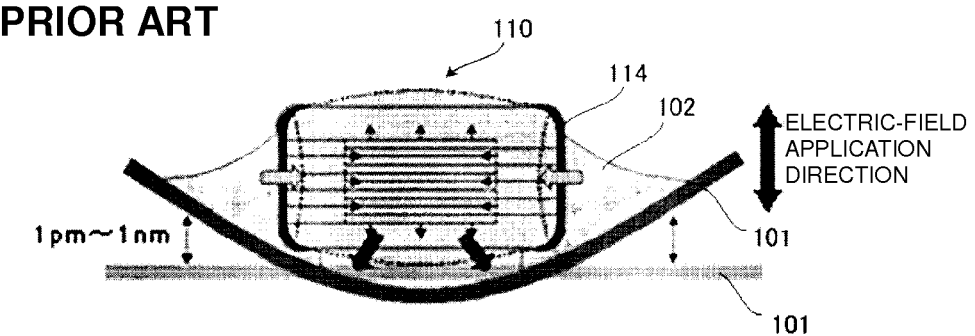
FIG. 6 illustrates a state in which an AC voltage is applied to the known monolithic ceramic capacitor mounted on a circuit board.

As illustrated in FIG. 5, when an AC voltage is applied to the monolithic capacitor 10, not only the end surfaces 15 but also the side surfaces 16 expand and contract. According to the first preferred embodiment, as illustrated in FIG. 2, the molten solder does not adhere to the end surfaces 15 or to portions of the side surfaces 16. Thus, the expansion and contraction that occurs as a result of the application of an AC voltage is not substantially transmitted to the circuit board 1. Consequently, vibrations of the circuit board 1 are reduced and acoustic noise is much less likely to be generated.

Further, as illustrated in FIG. 2, the molten solder adheres to the solder-receivable portions 18 of the outer electrodes 14. Thus, the fillets 3 are provided so as to connect the solder-receivable portions 18 to the circuit board 1, thus securely connecting the monolithic capacitor 10 and the circuit board 1 to one another.

In addition, preferably, the solder-receivable portion 18 is configured to include upper and lower portions that are symmetrical with each other. When the monolithic capacitor 10 is configured in this manner, each fillet 3 provided on the corresponding solder-receivable portion 18 will have substantially the same shape regardless of whether the upper surface of the monolithic capacitor 10 faces upward or downward when the monolithic capacitor 10 is mounted on the circuit board 1. Consequently, the amplitudes of vibrations transmitted to the circuit board 1 are substantially the same in both cases, thereby effectively reducing vibrations regardless of whether the upper surface of the capacitor 10 faces upward or downward.

In addition, as described above, the material of the solder-resistant film 19 is preferably a heat-resistant resin that is not deformed at the soldering temperature. Thus, a portion to which the solder is not to be adhered is maintained free from the solder at the soldering temperature when the monolithic capacitor 10 is mounted on the circuit board 1.

Here, a non-limiting example of a method of manufacturing the monolithic capacitor 10 according to the first preferred embodiment is described. First, an internal electrode 12 made of a material such as a silver-palladium (Ag—Pd) alloy, for example, is preferably printed on the surface of a ceramic green sheet made of a barium-titanate-based material, for example. The printing operation is repeated until a predetermined number of ceramic green sheets each including the internal electrode 12 are stacked on top of one another. Then, the stacked sheets are fired at a predetermined temperature to form a laminate body 13. Further, conductive paste is applied to both end portions of the laminate body 13 and the laminate body 13 is fired to form outer electrodes 14. The process described thus far is the same or substantially the same as that in a typical monolithic-capacitor manufacturing method.

In order to obtain the monolithic capacitor 10 according to the first preferred embodiment, solder-resistant films 19 are attached to all or substantially all of both end surface portions of the outer electrodes 14 and to a portion of the upper surface portion, the lower surface portion, and the side surface portions of the outer electrodes 14. The solder-resistant films 19 are preferably attached to these portions by dipping, for example. Specifically, one of the end surfaces 15 and a portion of the upper surface 8, the lower surface 9, and the side surfaces 16 are dipped in a bath filled with a paste material of the solder-resistant film 19. Subsequently, the monolithic capacitor 10 is withdrawn from the bath and the paste material that has adhered to the outer electrode 14 is cured. The solder-resistance film 19 is similarly attached to the end surface portion of the other end surface 15 and other portions of the upper surface 8, the lower surface 9, and the side surfaces 16.

Figure 3:
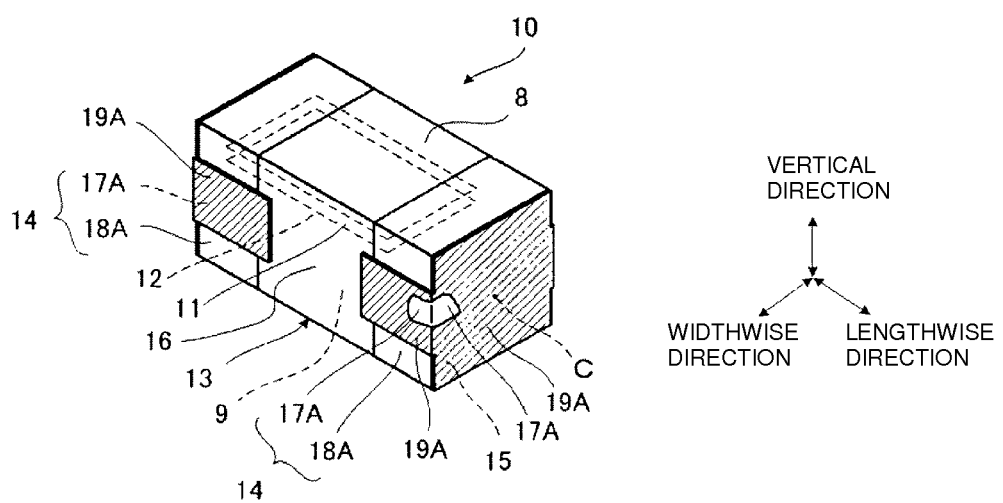
FIG. 3 illustrates a monolithic ceramic capacitor according to a modification of a preferred embodiment of the present invention in which the solder-repellent portion illustrated in FIG. 1 is modified.

The monolithic capacitor 10 according to the first preferred embodiment can be appropriately modified with respect to the position or the shape of the solder-repellent portions 17. FIG. 3 illustrates a monolithic capacitor according to an exemplary modification of the first preferred embodiment in which the solder-repellent portions 17 are modified.

In FIG. 3, when the monolithic capacitor 10 is viewed from one of the side surfaces 16, a solder-repellent portion 17A is arranged so as to extend over a middle portion of the side surface portion of the corresponding outer electrode 14. The solder-repellent portion 17A is arranged over the side surface portion of the corresponding outer electrode 14 by attaching a solder-resistant film 19A having a strip shape extending lengthwise to the outer electrode 14. Solder-receivable portions 18A are located on two opposed sides of the solder-repellent portion 17A in the vertical direction so as to sandwich the solder-repellent portion 17A. Also in this modification, the solder-repellent portion 17A is configured such that upper and lower portions of the solder-repellent portion 17A are symmetrical with each other and the solder-receivable portions 18A are also configured such that upper and lower ones of the solder-receivable portions 18A are symmetrical with each other.

Each solder-resistant film 19A is configured so as to extend over a portion of some of the dielectric ceramic layers 11 on the side surfaces 16 of the laminate body 13. Consequently, the solder-resistant film 19A is firmly adhered to the laminate body 13 and the solder-repellent portion 17A is less likely to be displaced or detached under high temperature conditions, such as during soldering.

The above-described first preferred embodiment and exemplary modification do not limit the present invention defined in the claims and can be modified in various manners within the scope of the present invention. Although a typical monolithic capacitor 10 is described as a non-limiting example in the first preferred embodiment, preferred embodiments of the present invention are applicable not only to a monolithic capacitor 10 including two outer electrodes 14 but also to a three-terminal monolithic capacitor having three outer electrodes 14, for example. In addition, preferred embodiments of the present invention are applicable not only to the monolithic capacitor 10 but also to general monolithic ceramic electronic components, including a monolithic LC filter, for example.

Second Preferred Embodiment

In a monolithic capacitor 20 according to a second preferred embodiment of the present invention, the outer electrodes 14 themselves are not subjected to a molten-solder repelling process. Components that are the same as those in the first preferred embodiment are not described in detail below.

Figure 4:
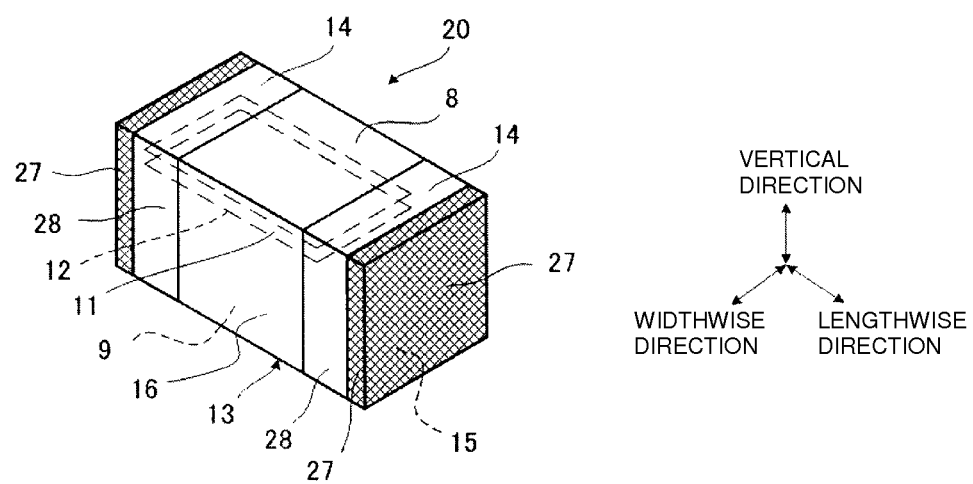
FIG. 4 illustrates a monolithic ceramic capacitor according to a second preferred embodiment of the present invention.

As illustrated in FIG. 4, each solder-repellent portion 27 is arranged over all or substantially all of the end surface portion of the corresponding outer electrode 14 and a portion of the upper surface portion, the lower surface portion, and the side surface portions of the outer electrode 14. Each solder-repellent portion 27 is provided by oxidizing a desired portion of the corresponding outer electrode 14. This oxidization prevents molten solder from adhering to the solder-repellent portion 27. A solder-receivable portion 28 is defined as a portion of the outer electrode 14 excluding the solder-repellent portion 27. The solder-receivable portion 28 is a portion of the outer electrode 14 that is not oxidized and that is exposed to the outside. Preferably, the solder-repellent portion 27 is configured such that upper and lower portions of the solder-repellent portion 27 are symmetrical with each other and the solder-receivable portion 28 is also configured such that the upper and lower portions of the solder-receivable portion 28 are symmetrical with each other.

In the monolithic capacitor 20 according to the second preferred embodiment, molten solder does not adhere to any portion of the end surfaces 15 or to the portion of the upper surface 8, the lower surface 9, and the side surfaces 16 covered by the solder-repellant portion 27. Thus, expansion and contraction that occurs as a result of application of an AC voltage is not substantially transmitted to the circuit board 1. Consequently, vibrations of the circuit board 1 are reduced and acoustic noise is less likely to be generated. Further, since the molten solder adheres to the solder-receivable portions 28 of the outer electrodes 14, fillets 3 are provided so as to connect the solder-receivable portions 28 to the circuit board 1, thus securely connecting the monolithic capacitor 20 and the circuit board 1 together.

Each solder-repellent portion 27 is preferably formed by fixing the monolithic capacitor 20 to a jig and then irradiating the corresponding outer electrode 14 with a laser beam, for example. By being irradiated with a laser beam, the surface of the outer electrode 14 is oxidized. The monolithic capacitor 20 made by the method including the oxidization process can achieve the same effects as those achieved by the monolithic capacitor 10 according to the first preferred embodiment without including another component, such as the solder-resistant film 19.

As in the case of the monolithic capacitor 10 according to the first preferred embodiment, the monolithic capacitor 20 according to the second preferred embodiment can be appropriately modified with regard to the arrangement and the shape of the solder-repellent portions 27 and the solder-receivable portions 28.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic ceramic electronic component comprising:
   a ceramic laminate body having a cuboid or substantially cuboid shape and including dielectric ceramic layers and internal electrodes alternately stacked on top of one another, the ceramic laminate body including an outer periphery defined by an upper surface, a lower surface, two side surfaces, and two end surfaces that are perpendicular or substantially perpendicular to the upper surface, the lower surface, and the two side surfaces; and
   an outer electrode disposed on one of the end surfaces and portions of the upper and lower surfaces and portions of the two side surfaces that are continuous with the one of the end surfaces so as to be electrically connected to the internal electrodes; wherein
   the outer electrode includes a solder-repellent portion to which molten solder does not adhere and a solder-receivable portion to which the molten solder adheres;
   the solder-repellent portion is arranged so as to extend over all or substantially all of a portion of the outer electrode provided over the end surface and so as to partially extend over portions of the outer electrode provided over the two side surfaces;
   the solder-receivable portion is provided in a portion of the outer electrode excluding the solder-repellent portion; and
   the solder-repellent portion is further arranged so as to partially extend over at least one of the upper and lower surfaces.

2. The monolithic ceramic electronic component according to claim 1, wherein when a direction in which the dielectric ceramic layers are stacked defines a vertical direction of the monolithic ceramic electronic component, the solder-receivable portion includes upper and lower portions in the vertical direction that are symmetrical with each other.

3. The monolithic ceramic electronic component according to claim 1, wherein the solder-repellent portion is defined by a solder-resistant film attached to the outer electrode.

4. The monolithic ceramic electronic component according to claim 3, wherein the solder-resistant film is made of a heat-resistant resin that is not deformed at a soldering temperature.

5. The monolithic ceramic electronic component according to claim 1, wherein the solder-repellent portion is defined by an oxidized portion of the outer electrode.

6. The monolithic ceramic electronic component according to claim 1, wherein the solder-receivable portion is provided in a portion of the outer electrode that is exposed to outside.

7. The monolithic ceramic electronic component according to claim 1, wherein the solder-repellent portion is further arranged so as to partially extend over the upper and lower surfaces.

8. The monolithic ceramic electronic component according to claim 1, wherein when a direction in which the dielectric ceramic layers are stacked defines a vertical direction of the monolithic ceramic electronic component, the solder-repellant portion includes upper and lower portions in the vertical direction that are symmetrical with each other.

9. The monolithic ceramic electronic component according to claim 1, wherein the outer electrode includes three layers of copper, nickel, and tin, or three layers of copper, nickel, and gold.

10. The monolithic ceramic electronic component according to claim 1, wherein the dielectric layers are made of a ferroelectric material.

11. The monolithic ceramic electronic component according to claim 1, wherein the dielectric layers are made of barium titanate.

12. The monolithic ceramic electronic component according to claim 1, wherein the internal electrodes are made of silver-palladium.

13. The monolithic ceramic electronic component according to claim 1, wherein the solder-repellant portion includes strip-shaped portions on the two side surfaces extending in a lengthwise direction of the outer electrode, and the solder-receivable portion includes upper and lower portions disposed above and below the strip-shaped portions.

14. A monolithic electronic component comprising:
   a laminate body including dielectric ceramic layers and internal electrodes alternately stacked on top of one another, and an outer periphery defined by an upper surface, a lower surface, two side surfaces, and two end surfaces that are perpendicular or substantially perpendicular to the upper surface, the lower surface, and the two side surfaces; and
   an outer electrode disposed on one of the end surfaces and portions of the upper and lower surfaces and portions of the two side surfaces that are continuous with the one of the end surfaces so as to be electrically connected to the internal electrodes; wherein
   the outer electrode includes a solder-repellent portion to which molten solder does not adhere and a solder-receivable portion to which the molten solder adheres;
   the solder-repellent portion is arranged so as to extend over all or substantially all of a portion of the outer electrode provided over the end surface and so as to partially extend over portions of the outer electrode provided over the two side surfaces;
   the solder-receivable portion is arranged to partially extend over the portions of the outer electrode provided over the two side surfaces; and
   the solder-repellent portion is further arranged so as to partially extend over at least one of the upper and lower surfaces.

15. The monolithic ceramic electronic component according to claim 14, wherein when a direction in which the dielectric ceramic layers are stacked defines a vertical direction of the monolithic ceramic electronic component, the solder-receivable portion includes upper and lower portions in the vertical direction that are symmetrical with each other.

16. The monolithic ceramic electronic component according to claim 14, wherein when a direction in which the dielectric ceramic layers are stacked defines a vertical direction of the monolithic ceramic electronic component, the solder-repellant portion includes upper and lower portions in the vertical direction that are symmetrical with each other.

17. The monolithic ceramic electronic component according to claim 14, wherein the solder-repellent portion is defined by a solder-resistant film attached to the outer electrode.

18. The monolithic ceramic electronic component according to claim 17, wherein the solder-resistant film is made of a heat-resistant resin that is not deformed at a soldering temperature.

19. The monolithic ceramic electronic component according to claim 14, wherein the solder-repellent portion is defined by an oxidized portion of the outer electrode.

20. The monolithic ceramic electronic component according to claim 14, wherein the solder-receivable portion is provided in a portion of the outer electrode that is exposed to outside.

\* \* \* \* \*